May 17, 1938.   F. JANSA   2,117,889
POWER TRANSMISSION SYSTEM
Filed March 20, 1937
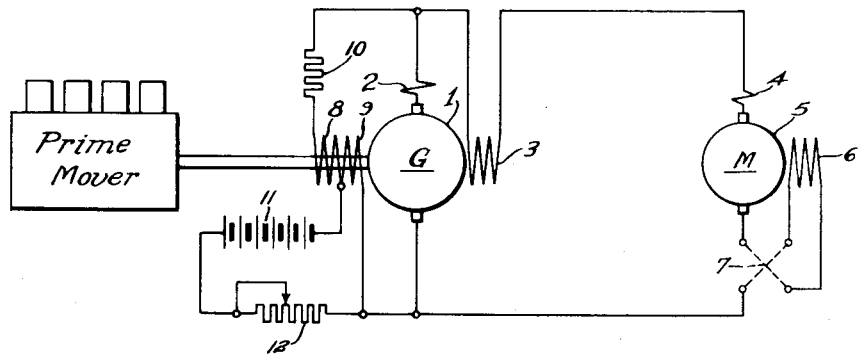
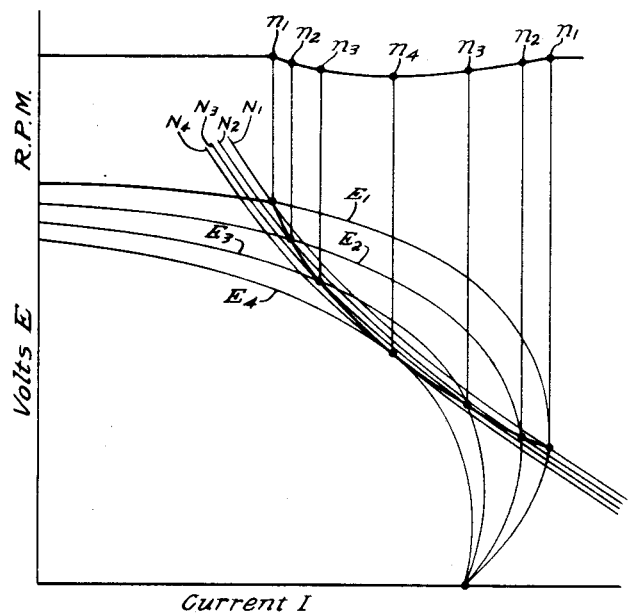
INVENTOR
Frantisek Jansa.

Patented May 17, 1938

2,117,889

UNITED STATES PATENT OFFICE 2,117,889

POWER TRANSMISSION SYSTEM

Frantisek Jansa, Prague, Czechoslovakia, assignor to Westinghouse Electric & Manufacturing Company, East Pittsburgh, Pa., a corporation of Pennsylvania Application March 20, 1937, Serial No. 132,056
In Czechoslovakia March 26, 1936

7 Claims. (Cl. 290—16)

This invention relates, generally, to power transmission systems and, more particularly, to the electric transmission of the power of a combustion engine to the driving wheels of a vehicle.

In previously known systems for the electric transmission of power on vehicles with combustion engines of medium horse power capacity generators having counter compound and shunt excitation and utilized to supply electric current to the driving motors. A generator of this type is particularly suited to meet the requirement of constant output within a wide range of load current and with only slight variation in the engine speed because of its drooping voltage characteristic. In order to obtain accelerating current of sufficient magnitude, it is necessary to provide such a generator with an additional field winding which compensates for the demagnetizing effect of the counter compound turns until the generator voltage rises to a value at which its own shunt excitation is sufficient. However, the additional field must be excited permanently to prevent a change of polarity of the generator.

In systems known so far, the power for the excitation of the additional field winding is furnished by separate sources, such as an auxiliary motor generator or a storage battery, the charging of which must also be provided for.

An object of the present invention is to simplify the generator in a power system of the foregoing type by omitting the additional field winding and utilizing a part of the generator shunt field winding to perform the function of the former.

Another object of the invention is to provide for charging the storage battery, which is utilized to energize a portion of the generator shunt field winding during acceleration of the vehicle, while the vehicle is in operation.

Other objects of the invention will be explained fully hereinafter or will be apparent to those skilled in the art.

According to one embodiment of the invention, a part of the generator shunt field winding is permanently connected to a storage battery during operation of the vehicle in order that the battery supplies current for separate excitation of the generator during acceleration periods and, when the vehicle is running, the battery is automatically charged by a portion of the exciting current of the generator, thereby making it unnecessary to provide a separate battery charging device.

For a fuller understanding of the nature and objects of the invention, reference may be had to the following detailed description taken in conjunction with the accompanying drawing, in which:

Figure 1 is a diagrammatic view of a power system embodying the invention, and

Fig. 2 is a view of curves showing operating characteristics of certain machines utilized in the system illustrated in Fig. 1.

Referring to the drawing, a generator G, driven by a combustion engine or prime mover, supplies power to a traction motor M. The main current from the generator armature 1 flows through an interpole winding 2, counter compound field coils 3 on the main poles of the generator, then to the traction motor M, its interpoles 4 and armature 5, series field coils 6 and thence through a field reversing switch 7 back to the armature of the generator.

The generator shunt field winding on the main poles of the generator consists of two parts 8 and 9, both wound in the same direction and connected in series, a resistor 10 being connected in the shunt field circuit. During the operation of the vehicle, the part 9 is permanently connected to a storage battery 11 through a regulating resistor 12.

In this manner the part 9 of the shunt field winding is separately excited by current from the battery 10 during the acceleration of the vehicle. After a certain voltage has been attained in the armature of the generator and the drop across the said part 9 of the shunt field winding becomes greater than the battery voltage, the current in the battery reverses and the battery is then charged by a portion of the exciting current of the generator. The separate excitation during accelerating periods and the charging current when the vehicle is running can be adjusted by means of the variable resistor 12.

Referring to Fig. 2, which shows the main operating curves of the electric transmission of power when the shunt field winding of the generator is connected in accordance with the present invention, it will be seen that the characteristic curve has the same desirable shape as known with electric transmissions which employ considerably more complicated and heavier equipment to obtain such results. In Fig. 2 are plotted the terminal voltages $E_1$, $E_2$, $E_3$ and $E_4$ of the generator, which correspond to the generator speeds $n_1$, $n_2$, $n_3$, and $n_4$, against the armature current I. The curves $N_1$, $N_2$, $N_3$ and $N_4$ represent the relation of the voltage E and current I to give constant output of the engine at speeds $n_1$, $n_2$, $n_3$, and $n_4$. The intersections of the corresponding E and N curves give the operating points of the engine-generator set.

The performance described in the foregoing applies to full fuel injection of the engine. The curves show that the connection in accordance with the present invention makes it possible to automatically maintain the electric output, volts times current, of the generator almost constant and that this is being obtained by means of equipment, which, compared with known arrangements, is much simpler and lighter.

Therefore, the invention provides a novel connection for automatic control of the output of a power system with an electric transmission according to which a part of the exciting current of the generator is used to charge the battery while the vehicle is running, this battery being utilized to supply power for the separate excitation of the generator during acceleration of the vehicle. The battery can also be used for other purposes, such as lighting and starting, thereby making it unnecessary to provide separate sources for such purposes.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a power system for a self-propelled vehicle, in combination, a combustion engine, a generator driven by the engine, a shunt field winding for said generator, a storage battery for energizing a part of said shunt field winding during acceleration of the vehicle, and means for adjusting the energizing current supplied by said storage battery.

2. In a power system for a self-propelled vehicle, in combination, a combustion engine, a generator driven by the engine, a shunt field winding for said generator, and a storage battery for energizing a part only of said shunt field winding during acceleration of the vehicle.

3. In a power system for a self-propelled vehicle, in combination, a combustion engine, a generator driven by the engine, a shunt field winding for said generator, a storage battery for energizing a part only of said shunt field winding during acceleration of the vehicle, and a variable resistor disposed in the battery circuit for adjusting the energizing current supplied by said storage battery.

4. In a power system for a self-propelled vehicle, in combination, a combustion engine, a generator driven by the engine, a shunt field winding for said generator, and a storage battery permanently connected across a part of said shunt field winding, whereby said battery separately excites the generator during acceleration of the vehicle and is charged by a portion of the exciting current of the generator while the vehicle is running.

5. In a power system for a self-propelled vehicle, in combination, a combustion engine, a generator driven by the engine, a shunt field winding for said generator, a storage battery permanently connected across a part of said shunt field winding, whereby said battery separately excites the generator during acceleration of the vehicle and is charged by a portion of the exciting current of the generator while the vehicle is running, and a regulating resistor connected in the battery circuit for adjusting the separate excitation during acceleration and the charging current when the vehicle is running.

6. In a power system for a self-propelled vehicle, in combination, a combustion engine, a generator driven by the engine, said generator having a counter compound field winding and a shunt field winding, and a storage battery permanently connected across a part of said shunt field winding, whereby said part of the shunt field winding is separately excited by the battery during acceleration of the vehicle and the battery is charged by a portion of the exciting current of the generator while the vehicle is running.

7. In a power system for a self-propelled vehicle, in combination, a combustion engine, a generator driven by the engine, said generator having a counter compound field winding and a shunt field winding, a storage battery permanently connected across a part of said shunt field winding, whereby said part of the shunt field winding is separately excited by the battery during acceleration of the vehicle and the battery is charged by a portion of the exciting current of the generator while the vehicle is running, and a variable resistor connected in the battery circuit for regulating the exciting current acceleration and the charging current when the vehicle is running.

FRANTISEK JANSA.